United States Patent [19]

Grande et al.

[11] 4,399,531
[45] Aug. 16, 1983

[54] DISTRIBUTED DIGITAL DATA COMMUNICATIONS NETWORK

[75] Inventors: Johannes Grande, Richardson; Raymond Bittel, Plano, both of Tex.

[73] Assignee: Rockwell International Corporation, El Segundo, Calif.

[21] Appl. No.: 191,969

[22] Filed: Sep. 29, 1980

[51] Int. Cl.³ .................... H04J 6/00; H04Q 11/04
[52] U.S. Cl. .................................. 370/60; 370/94; 340/825.02
[58] Field of Search ............. 370/60, 61, 94, 54, 370/16; 340/825.02, 825.03, 825.04

[56] References Cited

U.S. PATENT DOCUMENTS

| | | | |
|---|---|---|---|
| 3,766,322 | 10/1973 | Moffett et al. | 370/60 |
| 4,074,232 | 2/1978 | Otomo et al. | 370/94 |
| 4,276,643 | 6/1981 | Laprie et al. | 370/16 |
| 4,317,193 | 2/1982 | Joel | 370/54 |
| 4,320,500 | 3/1982 | Barberis | 370/94 |

OTHER PUBLICATIONS

"On Communications and Networks" by Kleinrock, IEEE Transactions on Computers, vol. C-25, No. 12, pp. 1326-1335, Dec. 1976.

"Experimental Packet-Switched Service: Procedures and Protocols, Part 1-Packet Formats, Facilities and Switching" by Neil et al., Post Office Electrical Engineers' Journal, vol. 67, pt. 4, pp. 232-239, Jan. 1975.

*Primary Examiner*—Douglas W. Olms
*Attorney, Agent, or Firm*—Richard K. Robinson; Howard R. Greenberg; H. Fredrick Hamann

[57] ABSTRACT

A distributed digital data communication network having widely dispursed nodes provides for effective transmission of messages between each node through the use of flood routing. A response message based upon stored data link status obtained when a message is received through the flood routing protocol selects the shortest time delay path for responding to that message. This process eliminates network instability.

12 Claims, 13 Drawing Figures

DISTRIBUTED DIGITAL DATA COMMUNICATIONS NETWORK

BACKGROUND OF THE INVENTION

This invention relates to distributed data communication networks.

The use of distributed data communication networks is a well-known concept for data communication between several users. The advantages of the concept are that functional separations between a distributed transmission network and the rules that determine the communication needs are characteristics of the different users. For a network to be truly distributed, all nodes to which the users are connected must be identical. Each node must contain the mechanism of transmitting messages, error control and fault detection. The transmission network should be independent of any hierarchy or control characteristics which may exist amongst the users and as such, master or slave users may move around and connect to different network nodes with no impact on the transmission network.

SUMMARY OF THE INVENTION

Meeting the above requirements of a communication network often resulted in network instability and deadlock which prevented effective data communication.

A distributed digital data communication network having widely disbursed nodes provides for effective transmission of messages between each node through the use of flood routing. A response message based upon stored data link status obtained when a message is received through the flood routing protocol selects the shortest time delay path for responding to that message. This process eliminates network instability.

Each node consists of a link interface which interfaces the node with the data links connecting other nodes and provides modulation/demodulation, code converting such as Manchester or diphase coding and message arrangement for forwarding to other circuits within the node. The interface controller 13 buffers the messages that are to be transferred to or received from the link interface; performs error checking and indicates the status of a transmission link due to transmission anomalies as detected during the error checking process; performs error code generations so that the receiving messages may be verified for lack of transmission errors; initiates retransmissions of acknowledgment or non-acknowledgment signals indicating that a message was received or not received correctly; and maintains an active message table with data link information so that duplicate messages are discarded. The link information is used for establishing the shortest time delay path. Each node also includes a nodal processor which decodes the message field contained in each message; can perform a timeless and authentication check on the validity of the data deleting either untimely or non-authentic messages; maintains status controls that include the type of message being received and the address the message is being sent to, either the nodal address or the address of a subscriber (I/O terminal) located at that address; provides privacy encoding and decoding; selects the shortest time delay path for the response message; and performs message formatting.

BRIEF DESCRIPTION OF THE DRAWINGS

The following detailed description will enable the invention to be more fully comprehended. A list of relevant figures accompanies the description in which.

DETAILED DESCRIPTION OF THE PREFERRED EMBODIMENT

Figure 1:
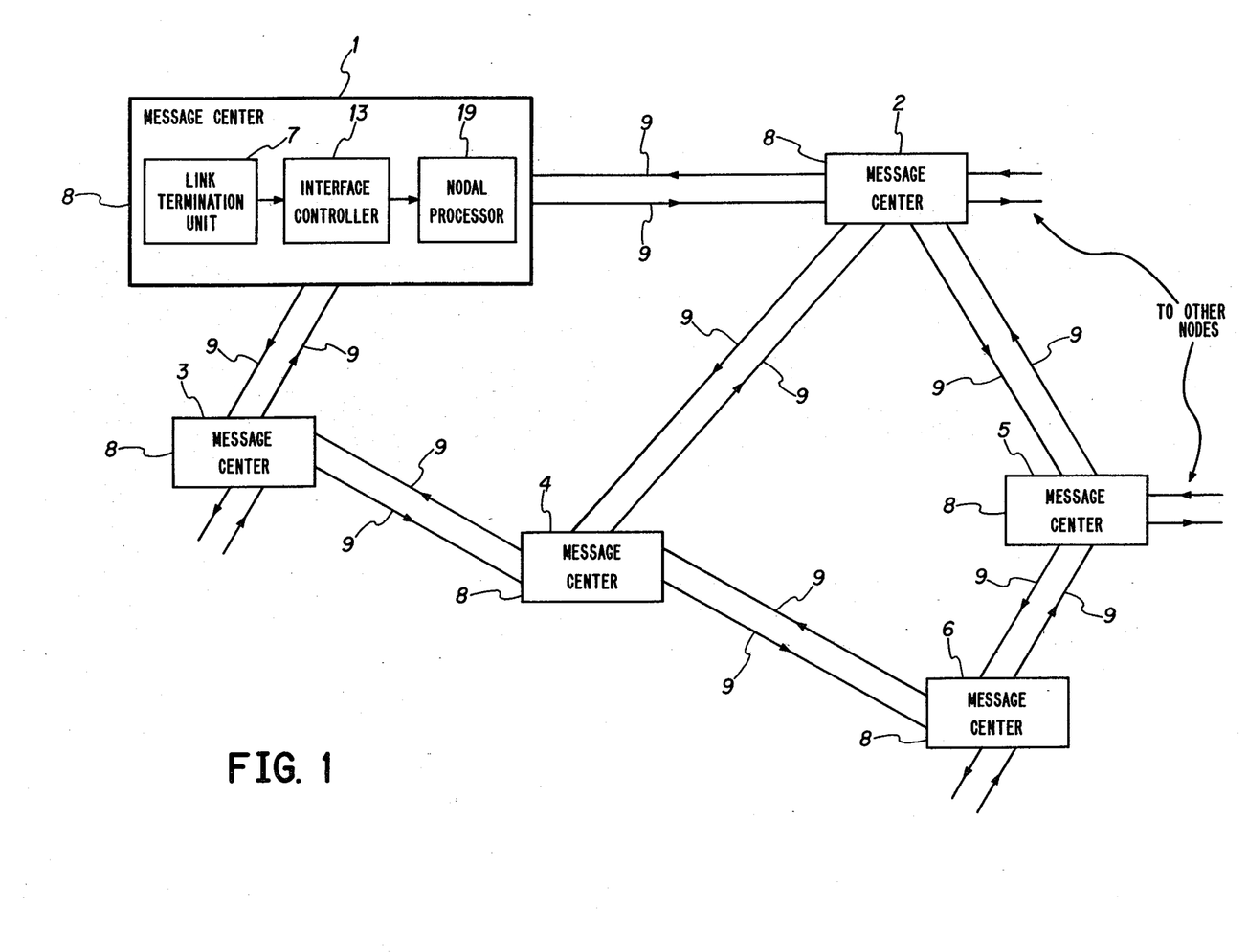
FIG. 1 is a block diagram of a portion of a digital communications network according to the invention.

A block diagram of an abbreviated portion of a digital data communication network incorporating the invention is shown in FIG. 1. Nodes 1-6 of this network include a message center 8 that is interconnected by means of full duplex transmission paths 9 which may be any of the known types of transmission medias. The nodes, in practical application, are geographically separated. Signals either electrical or optical depending upon the transmission media and representing finite length messages are carried by the transmission paths to each of the nodes. The signals are transmitted at different rates and also in an asynchronous mode with respect to one another. The signal is applied to the link termination unit 7 of the message center where the signal is demodulated, code converted and a binary stream of digital data is provided to the interface controller 13 for message processing by the link termination unit 7. The interface controller 13, after processing the binary or digital data, forwards the message to the nodal processor 19 for further processing which then may transmit the message to an I/O terminal or initiate retransmission of the message to another node. The process is reversed for a node in which the message center 8 receives an input message from the I/O terminal, not shown. The data is again processed by the nodal processor 19 and forwarded to the interface controller 13 which again performs additional processing on the message and provides to the link termination unit 7 a binary stream of digital data for converting the binary representation of the message into a signal for transmission by the link termination unit 7.

Figure 2:
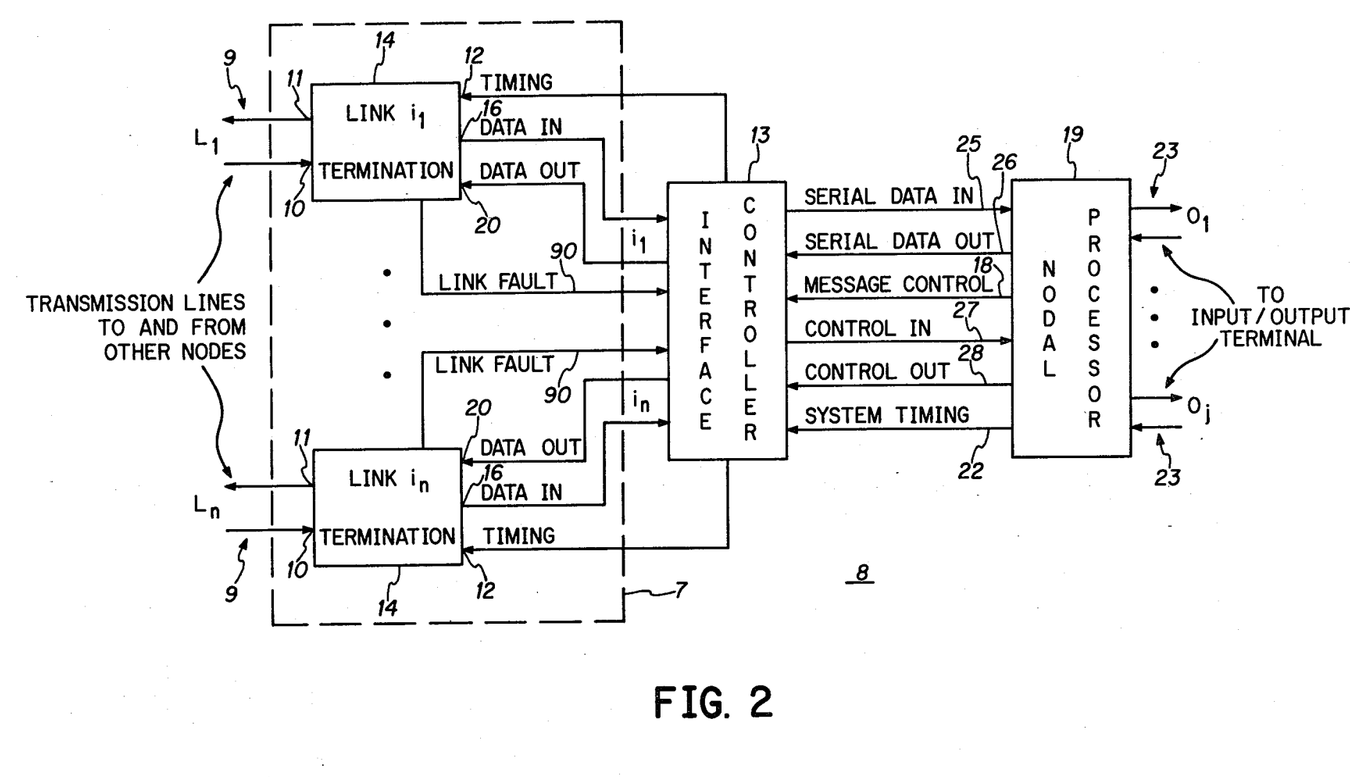
FIG. 2 is a block diagram showing a node in the network with a multiplicity of incoming and outgoing links.

The operation of the message center 8 is further illustrated in FIG. 2 to which reference should now be made. The nodes are interconnected, as was mentioned earlier, by the transmission path 9 at each message center. There are provided capabilities of establishing links between the nodes at each message center 8 for the links $L_1$ where $L_N$ where N is the number of nodes that are to be connected to the node. Each link has associated with it a transmission path 9 that is brought into the link termination unit 7 wherein each member of the path is terminated at a link termination 14. Each link termination 14 has associated with it an input terminal 10 and an output terminal 11. When there is an incoming signal detected at input terminal 10, the link termination 14 demodulates the signal and obtains binary digital data therefrom and then performs any required code conversion before transferring the demodulated digital data to the interface controller 13 by way of the data-in terminal 16. The link termination 14 will provide on terminal 11 a signal represented by the digital data that is present on terminal 20, the data-out terminal, that is provided by the interface controller 13, after modulation of the binary data and performing any required code conversion. Timing for the link termination 14 is received at terminal 12 from the interface controller 13. Link fault is provided for each link to the interface controller 13 by conductors 90.

The interface controller 13 essentially functions as a multiplexer/demultiplexer for multiplexing the digital data from the link termination 14 and the nodal processor 19. Consequently, the interface has $i_1$ through $i_N$ I/O channels. The interface controller 13 processes the message received from all the link terminations 14 including error detection and correction and provides the incoming data to the nodal processor 19 via the serial data-in conductor 25 and accepts and performs error code generating to the outgoing message via the serial data-out conductor 26 from the nodal processor 19. The status of the incoming message is provided to the nodal processor 19 from the interface controller 13 via the control-in conductor 27 and the status of the outgoing message from nodal processor 19 is provided via the control-out conductor 28.

The nodal processor 19 provides a message control line to the interface controller 13 via the message control conductor 18 as well as the system timing to the interface controller 13 via conductor 22. The nodal processor 19 further processes a message to be in a form acceptable to a selected input/output (I/O) terminal. The nodal processor 19 is capable of interfacing with a plurality of input/output terminals via links $O_1$ and $O_J$ and is connected to the terminals not shown via the conductor pairs 23.

Figure 3:
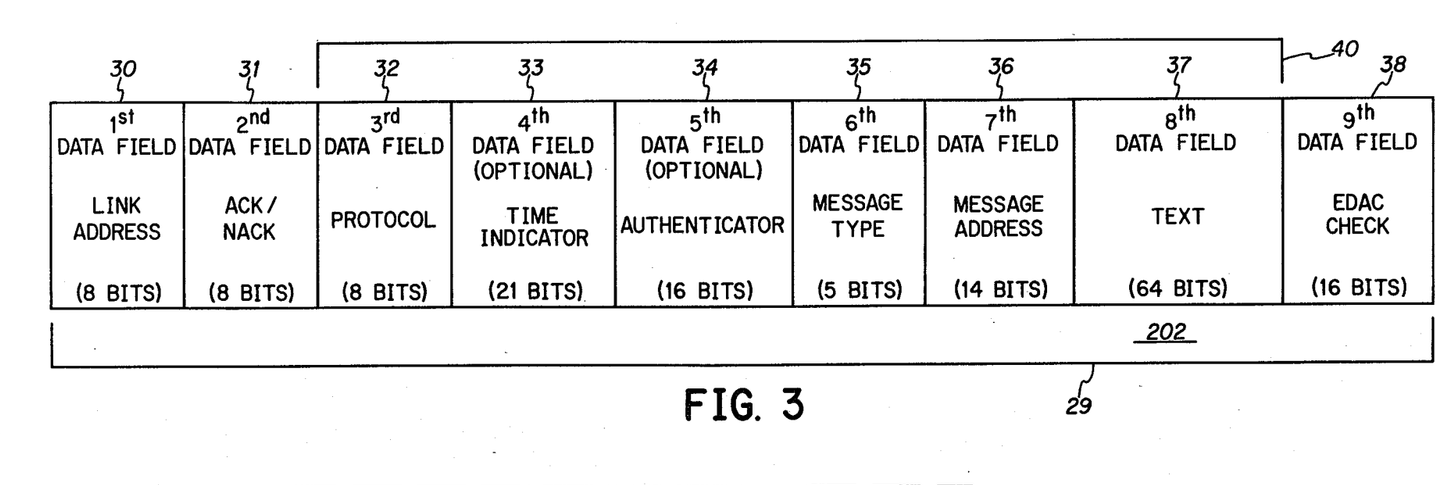
FIG. 3 is a diagram of the message structure that transverses the links between nodes in the network and is processed by the interface controller.

The operation of the message center as well as the overall system can best be understood by referring to the preferred message format illustrated in FIG. 3. The message format 202 indicated by dimension lines 29 consists of 160 data symbols that is either received or conveyed to the link termination unit 7 by the interface controller 13. The first group of data symbols 30 consist of the link addresses which means that up to 256 different links may be addressed by a given node. The link address is appended to the message that is received by the interface controller 13 from the nodal processor 19 via the serial data-out conductor 26 and is used by the interface controller 13 to signify what link the message is to be transmitted on. If the message 202 is the demodulated message received via the interface controller 13 from the link termination unit 7 then it identifies what link the message was received on. If the message was received during the flood search mode of operation which will be discussed later in detail, then the first group of data symbols identifies the link in which the message was first received by the receiving node and over which any response to the message will be transmitted from the node when executing the shortest time delay path mode. The second data field 31 consists of eight symbols which provides for acknowledging a message by the receiving node when the message is received correctly by transmitting the selected ACK symbol or when the message was incorrectly received by transmitting a NACK symbol which will result in a retransmission of the message by the transmitting node. This is also the protocol used by the node receiving the message for acknowledging receipt thereof that is sent in the next message it will send to the node from which it received the message. If no return message is to be sent to the transmitting node to acknowledge the received message, then a general purpose acknowledgment message is returned to the adjacent node. The transmitting node on receiving the message will take appropriate acknowledgment action within the interface controller 13 and recognize the message as an acknowledge message and prohibit further processing of the message. The third data field 32 is the protocol data field and consists of eight data symbols and is used by the node to determine how the message is to be routed; either, as will be discussed later, flood search or the shortest time delay path. This field is processed by the nodal processor 19 and is contained in each message transmitted in the network. The fourth field 33 provides an option to have a time indicator and consists of 21 bits or symbols which is used by the nodal processor 19 to determine the age of the message. In the preferred embodiment a maximum time interval of one minute is provided for the message to be received by the node to which it is addressed. Each node has an internal time-of-day clock whose time is used as an absolute measurement against which the time field is compared. The 21 symbols establish the month, day, hour and 0.5-minute interval during which the message was sent. Since the internal clock at each node can be synchronized to within microseconds using established techniques, this interval is long enough to maintain message flows for a year. The time indicator is used to prevent old messages from being reintroduced into the network as valid new messages. The timing logic used to generate this timing field is controlled by the system timing signal, generated by the internal clock within the nodal processor 19. Another option provided to the invention is the authentication data field shown in FIG. 3 as the fifth data field 34 which consists of 16 data symbols and is processed by the nodal processor 19 logic. In the preferred embodiment, this field is derived from a 16 data-bit cyclic redundant code polynominal that is generated by the polynominal dividing of the data symbols contained in the sixth data field 35, the seventh data field 36, and the eighth data field 37 and is attached to each message and functions as a means of insuring that the message was actually originated at a node that is a member of the network and not introduced by an unauthorized source or in a spurious manner.

There are three general classes of messages that are transmitted between the nodes within the network. These classes include a command message, a response message, and a status message. The sixth data field 35 is used to indicate the type of message that is either being transmitted or received and in the preferred embodiment utilizes five symbols or bits. This provides a means of having a maximum of 32 different message types which can be members of any one of the three classes that can be transmitted within the network.

The seventh data field 36, is fourteen symbols in length and specifies the address of the node for which the message is intended, or the address of an input/output terminal that is connected to a node. As will be discussed later, the initial transmission of a message is accomplished by means of flood search mode and a message is conveyed to all nodes, therefore, an unique address for both a node and an input/output terminal that is associated with a particular node need not be contained in a message. Every node that is a member of the network maintains a list of all input/output terminals that are associated with it or homed on it. When a node receives a message addressed to it or to one of its input/output terminals, the address contained in data field 7 will be interrogated and processed in accordance with the instructions determined from the message type that is provided in the sixth data field 35 and, if appropriate, the message will be prepared and relayed to the addressed input/output terminal. If the message is not addressed to the node receiving it including its input/output terminals, or its multiple address message, it is processed for message validity and retransmitted according to the routing and error control protocols.

The eighth data field 37 is the text of the message and can accommodate up to 64 data symbols or bits. The field contains the actual text of the message to be acted upon by a node or one of its input/output terminals.

The ninth data field 38 provides for the error detection and correction code and consists of 16 symbols which in the preferred embodiment is a cyclic redundancy code generated by polynominal division over the first data field through the eighth data field for a total numerator of 144 data symbols or bits. The code is provided as a means of determining if errors have corrupted the message. This check is performed on the message at each node and is used to generate an acknowledgment that is transmitted to the neighboring node that transmitted the message. If after performing the check on the error code there shows that there was not an error, then a positive acknowledgment is returned to the neighboring node in the second data field or an ACK code is transmitted. If the error code proves that there was a transmission error, then a negative acknowledgment (NACK) is returned to the transmission node and a retransmission is automatically requested.

The interface controller 13 of FIG. 2 will in the receive mode strip off the link address which in the preferred embodiment is the first data field 30 and the ACK/NACK word which is the second data field 31 and the ninth data field 38, the error detection and correction data field, and log a copy of the remaining truncated message that includes the third through eighth data fields and forward these fields to the nodal processor 19 for further interrogation and action. In FIG. 3, there is shown a diagram by dimension lines 40 of the truncated message in accordance with the present invention which is received by the nodal processor 19 from the interface controller 13 or the message that is forwarded to the interface controller 13 if it is a message generated at the node. The truncated message contains the third through eighth data fields of the message received from the network or is to be forwarded to the network and processed by the interface controller 13. If it is a received message, the third, fourth, fifth, sixth and seventh data fields are processed by the nodal processor 19 to determine if the message is destined for an input/output terminal associated with that node.

The sixth data field 35 contains the message type and determines whether or not the text that is contained in the eighth data field 37 is to be processed by the node or collect status about the node. If the message is received and is part of a larger message that has a text that contains more than 64 symbols or bits, the sixth data field 35 will indicate that subsequent portions of the message are to be expected. There is an unique code that can be used in the sixth data field to indicate that the eighth data field 37 contains the last text of a larger message and that transmission of that message is complete.

The large messages that require more than an eighth data field 37 are transmitted and arrive at a node one at a time and in sequence, thus, alleviating the possibility of receiving text information contained in the eighth data field 37 out of sequence but other messages may be interleaved within the larger message. Additional controls on the message through the routing protocols, as will be discussed later, insure that no text information that is contained in an eighth data field will be lost unless a node becomes totally isolated from the network.

Figure 4:
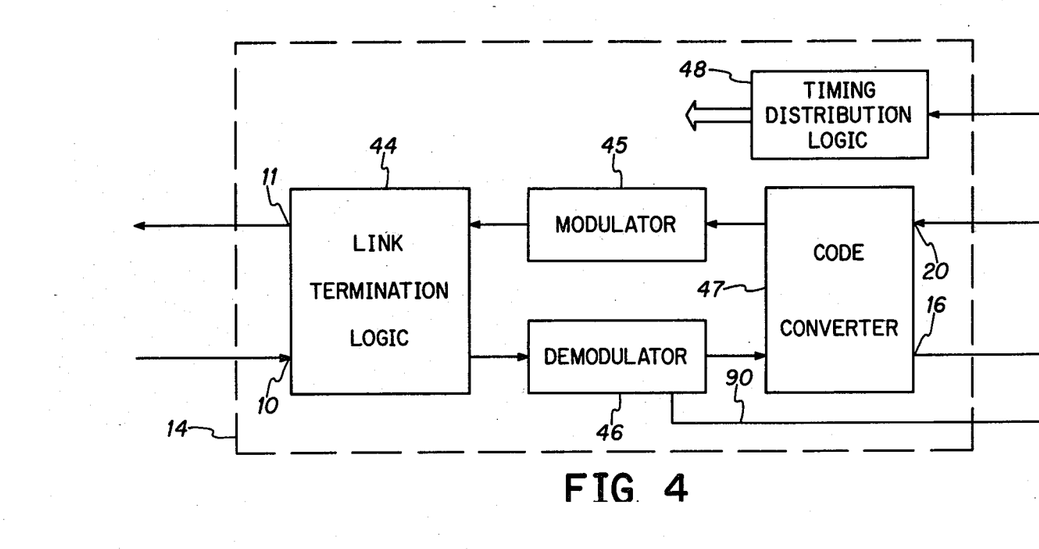
FIG. 4 is a block diagram showing the line termination unit to be used at a network mode.

FIG. 4 is a functional diagram of the link termination 14 which is part of the link termination unit 7 of FIG. 2. Messages are received from the network and terminated in the link termination logic 44 at terminal 10. The link termination logic consists of signal conditioners and interfaces, such as electrical or optical couplers, between the data links and code converters. The messages are demodulated by the demodulator 46 and code converted by the code converter 47 to a binary symbol or bit stream that is forwarded to the interface controller 13 for additional message evaluation and checking. In the transmit mode, messages from the interface controller 13 are code converted by the code converter 47 via terminal 20 and modulated by the modulator 45 and transferred to the link termination logic 44 for eventual transmission to the data link via terminal 11. Timing signals are received from the interface controller 13 and distributed to the logic elements of the link termination unit 14 by the timing distribution logic 48. If the demodulator detects data link failure such as loss of carrier, open loop or loss of synchronization, it will forward a link fault signal to the nodal processor 19 for organization of a nodal status message to inform either the network or I/O terminals or both via modem fault conductor 90 and the interface controller 13.

Figure 5:
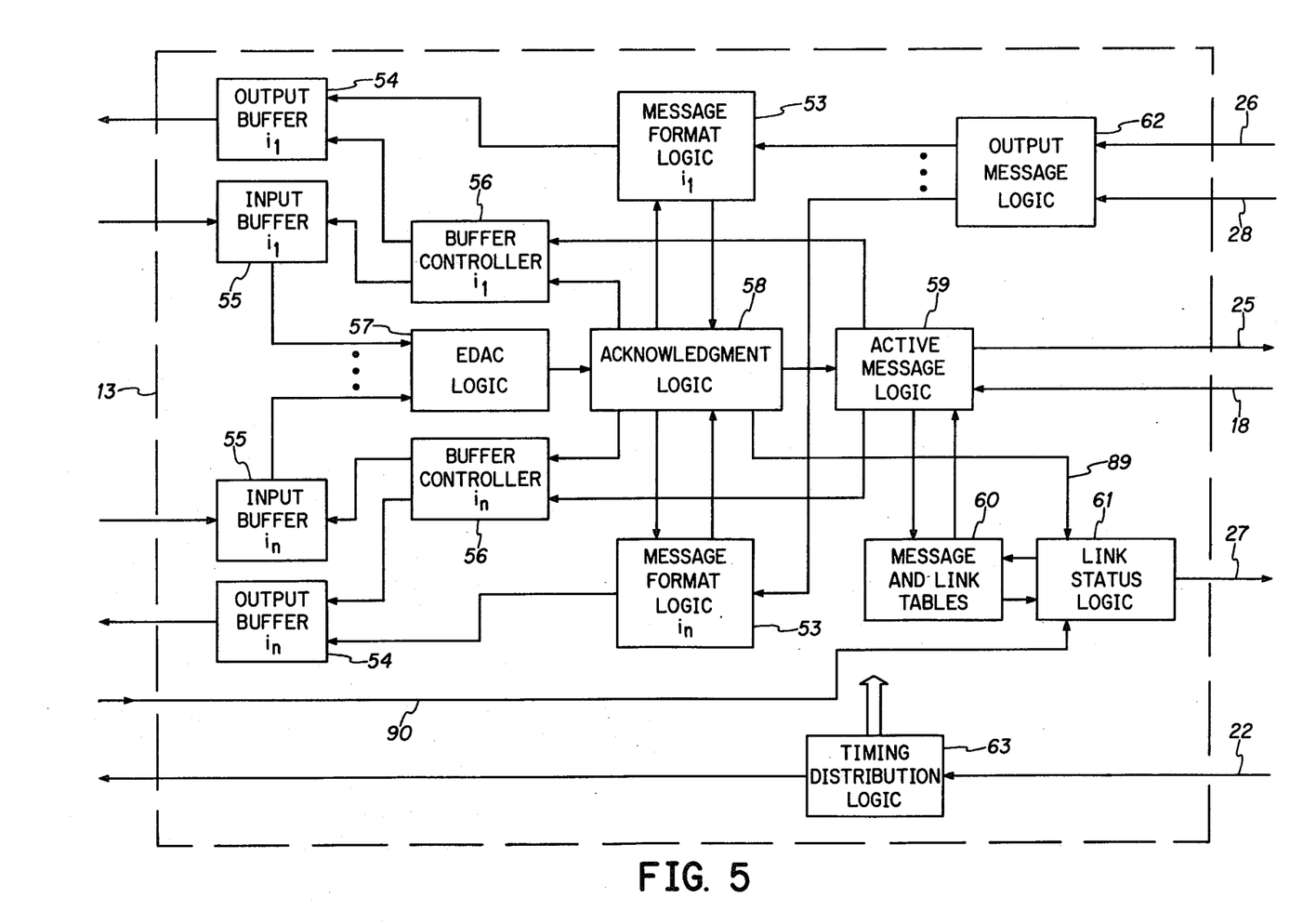
FIG. 5 is a block diagram of the interface controller to be used at a network node with a multiplicity of incoming message streams.

FIG. 5 is a functional block diagram of the interface controller 13 in accordance with the invention. The interface controller 13, as was discussed earlier, is joined to the link termination 14 and provides a bidirectional communication channel that includes an input buffer 55 and an output buffer 54 for each link termination 14. The input buffer receives the data message from the individual link termination for channels $i_1$ through $i_N$ and buffers the information in the input buffers 55 assigned to the receiving channel. During the time that the information is being buffered, the error detection and correction logic (EDAC) 57 is checking the message to insure that there are no transmission errors present under the control of the buffer controllers 56. Each channel $i_1$ through $i_N$ has its own associated buffer controller 56. The incoming messages are checked for errors, as was mentioned earlier, and the results of the error checks, together with the message are forwarded to the acknowledgment logic 58. The acknowledgment logic 58 prepares an acknowledgment message to be transmitted back to the node from which it received the message that is based upon the results of the errors checks and the link address. This information is provided by the acknowledgment logic to the appropriate (the channel the message was received on) channel $i_1$ through $i_N$ by the message format logic 53. The message format logic 53 will insert this information into the next message that is to be transmitted to the node from which the message was received. In the event there is no message available to be transmitted, the message format logic 53 generates an acknowledgment message with appropriate ACK/NACK word or acknowledged/non-acknowledged code inserted in to it representing the results of the information provided to the acknowledgment logic 58 by the EDAC logic 57. This acknowledge message is transmitted to the neighboring node that transmitted the message. The acknowledgment logic 58 also scans the second data field 31 of the received message as illustrated in FIG. 3 for acknowledgment or non-acknowledgment data words and signals the appropriate buffer controller 56 of the channel upon which the input message was received to remove or retransmit the message previously transmitted to the node. This is accomplished by the buffer controller 56 signalling the output buffers 54 of the appropriate channel $i_1$ through $i_N$ and upon completion of the error checks and acknowledgment response, this message is passed from the acknowledgment logic 58 to the active message logic 59. The active message logic 59 checks the most recently received message against those messages in the message and link tables 60 and if there is no match or, in other words that the message being checked is being received for the first time, a signal is returned from the message and link tables 60 to the active message logic 59 that indicates that the message that is stored within the acknowledgement logic 58 is to be forwarded to the nodal processor 19 of FIG. 2 for further processing. If there is a message match or in other words, the most recently received message is a duplicate of a prior received message, then the message and link tables 60 will indicate a redundant message and a signal is returned to the active message logic 59 to inhibit the message from being sent on to the nodal processor 19. The redundancy is removed from further processing and discarded from the system. In either event, after a received message is checked by the active message logic 59, a signal is sent to the buffer controller 56 of channel $i_1$ through $i_N$ to transfer the next message from the input buffer to the EDAC logic 57. The active message logic 59, through the buffer controller 56 of the channels $i_1$ through $i_N$ polls the input buffers one at a time in sequency $i_1$ through $i_N$. Only one message from a given buffer is allowed to be processed at any time. The active message logic 59 also receives control information on the link status from the nodal processor 19. This status is used in the polling process to inhibit messages from being removed from an input buffer. The link status logic 61 periodically reviews the message and link tables 60 to determine if the message from all links are being received and processed. The message and link table 60 provides a signal to the link status logic to obtain a status check. The status is forwarded to the nodal processor 19 of FIG. 2.

The interface controller 13 functions in a similar manner for messages that originate or are processed by the nodal processor 19 of FIG. 2 in that when a message is to be transmitted, the nodal processor 19 forwards the message to the output message logic 62 along with the routing protocol information that is contained in the third data field 32 of FIG. 3. The protocol information determines if the message is to be flood routed or if it is destined for a single output buffer as part of the shortest time delay node. The output message logic 62 passes the information to the message format logics 53 of all the channels $i_1$ through $i_N$ which constructs the message including the generation of the error detection and correction code to be transmitted to the network. The formatted messages are sent to the output buffers 54 of channels $i_1$ through $i_N$ and are forwarded to the link termination unit 7 for eventual introduction on to the data links. Timing and control for the operation of these logic functions is provided by the timing and distribution logic 63 and the timing signal from the nodal processor 19 as well as passing the timing on to the link termination unit 7.

Figure 6:
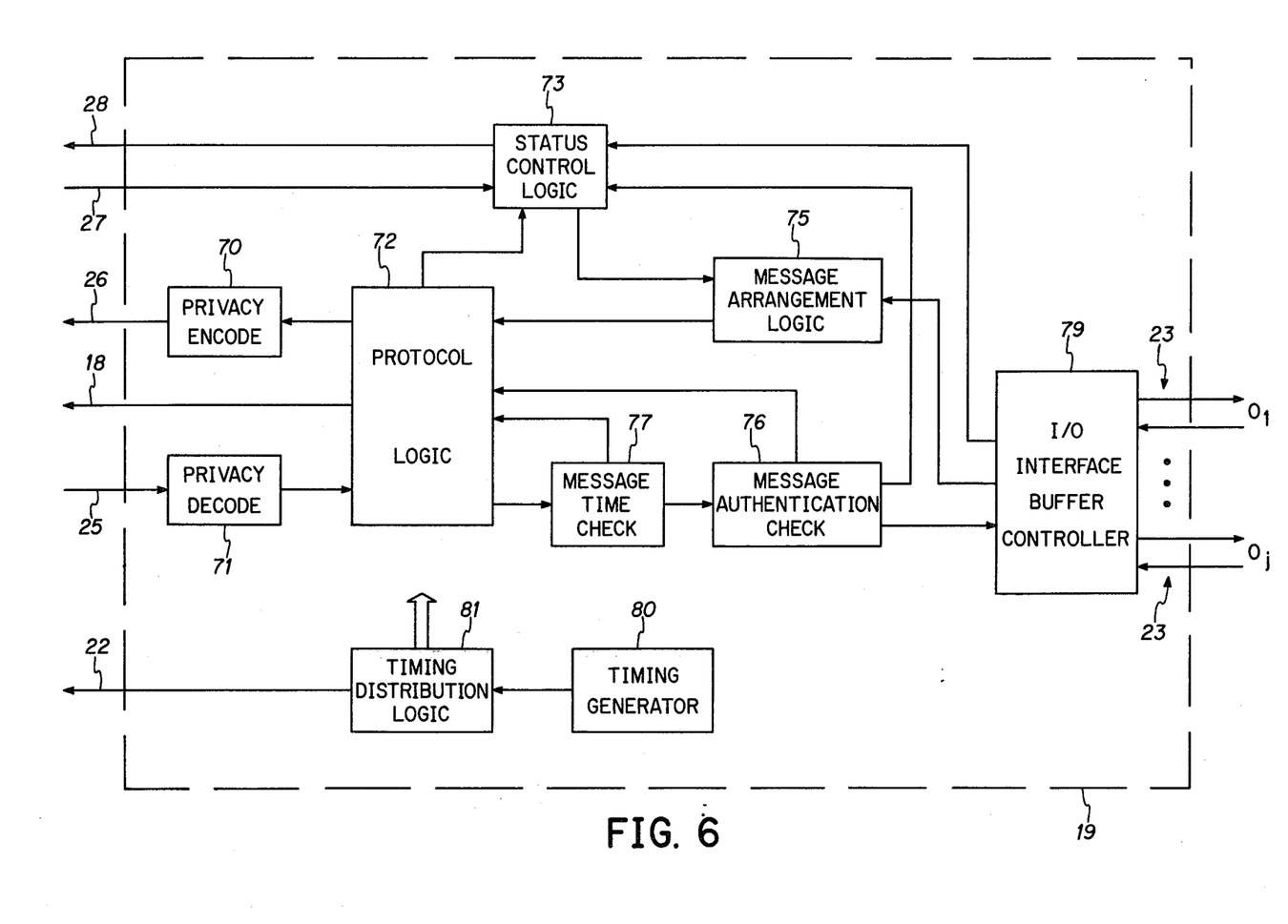
FIG. 6 is a block diagram of the nodal processor to be used at a network node.

The acknowledgment logic maintains a record of the EDAC status for the M most recent transmissions for each input channel $i_1$ through $i_N$. If among these M transmissions, the number of transmissions with errors exceeds a predetermined threshold, or mode m fault occurs, a channel fault signal is forwarded to the status control logic 73 in the nodal processor 19 via conductor 89 from the acknowledgment logic, conductor 90 and the link terminal unit, and link status logic 61 for origination of a nodal status message to other network nodes and to local I/O terminals.

FIG. 6 is a functional block diagram of the nodal processor 19 of FIG. 2. The nodal processor 19 transfers messages to and receives messages from the interface controller 13 and also transfers messages to and receives messages from the input/output terminals (not shown). The messages that are conveyed across the interface between the nodal processor 19 and the interface controller 13 are arranged in the format illustrated in FIG. 3 by dimension lines 40 and include the third through eighth data field. When the transfer is from the interface controller 13, the message is received by the optional privacy decoder 71 and then is passed on after performing the necessary decryption to the protocol logic 72. Without the proper message decryption key, it is impossible for an unauthorized message to be passed to the protocol logic 72 and as such message information cannot be read or acted upon. The protocol logic 72 interprets the protocol word that is contained in the third data field 32 of FIG. 3 and stores this information for use in routing a response message. As an option, there is provided a means for performing and authentication checks by the message time check 77 and the message authentication check 76. If these options are implemented and a message fails the time check, a signal is returned to the protocol logic 72 and the message is not further processed and, in a similar manner, if the message fails the authentication check, the protocol logic ceases further processing. In the event that a message fails either the time check or the authentication check or both, the protocol logic 72 activates the status control logic 73 which informs the active message logic 59 of the interface controller 13 to update the message and link tables 60 and the message is discarded. If the message passes the time and authentication checks or if these options are not present, it is forwarded to the I/O interface buffer controller 79. The message authentication check 76 further sends a signal to the protocol logic 72 indicating that the message is valid. This signal is returned to the active message logic 59 in the interface controller 13 so that the message and link tables 60 can be updated. The I/O interface buffer controller 79 determines the message type from the word that is stored in the sixth data field 35 of FIG. 3 and also the message address from the word that is contained within the seventh data field 36 of FIG. 3 and provides transmission speed, code and format conversion information for the messages to be transferred to the input/output terminals by conductor 23. If a message is determined to be merely a status collection message, the input/output buffer controller 79 sends a signal to the status control logic 73 whereby the status information is gathered from the interface controller's 13 link status logic 61 and notifies the message arrangement logic 75 to format a status message containing status information in the eighth data field 37 of FIG. 3. If the I/O interface buffer controller 79 determines from the message address that the message is addressed to another node, it forwards the message unchanged to the message arrangement logic 75 for disposition.

The I/O interface buffer controller 79 on receiving data input from an input/output terminal via one of the input/output channels $O_1$ through $O_j$ converts the data and sends it to the message arrangement logic 75 which takes the received data from either the status control logic 73 or the I/O interface buffer controller 79 and arranges a message including time indication and authentication (if the option is used); address and text; and forwards the message to the protocol logic 72 for transmission. The protocol logic 72 interprets the message type received and concentrates the routing protocol information in the message resulting in a message as shown in FIG. 3 indicated by dimension lines 40. The protocol logic 72 sends the routing information to the output message logic 62 in the interface controller 13 of FIG. 5 via the status control logic 73. The message is transferred from the protocol logic 72 to the optional privacy encoder 70 for message protection and then forwarded on to the interface controller 13. The timing generator 80, including a clock, generates the system timing and passes it on to the timing distribution logic 81 which provides the timing to the nodal processor 19 as well as forwarding the timing on to the interface controller 13.

Figure 7:
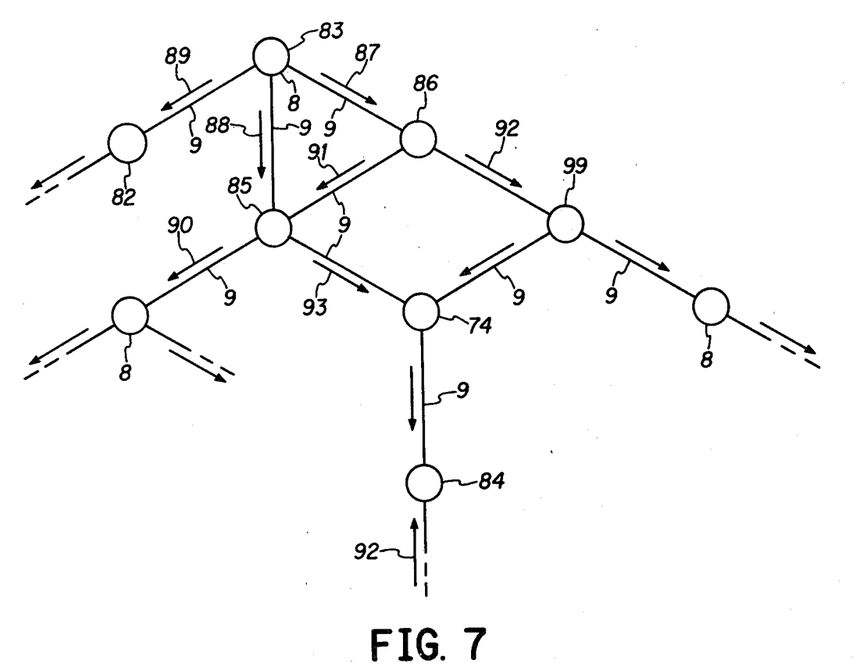
FIG. 7 is a diagram showing the flood protocol in a portion of a digital data communications network.

There are two modes of message propagation or protocols that are used in transferring messages through the communications network. The first is the flood search mode and the second is the shortest time delay path mode. FIG. 7, to which reference should now be made, illustrates the flood search mode of transmitting messages through the network. The operation of the flood search mode as illustrated in FIG. 7 in which a node 83 through its I/O terminals or other means desires to transmit a message to node 84. Node 83 transmits the message to all neighboring nodes 82, 85, and 86 that it is interconnected with by interconnecting data links 9 as illustrated by flow arrows 87, 88, and 89. Nodes 82, 85 and 86 retransmit the message to their adjacent nodes until the message arrives at node 84. The flood search mode of transmitting data allows all nodes to receive a message originating at any node in the network within a finite length of time. The messages are transmitted on all data links 9 from a node except the link on which the message was received. That is to say, for example, that node 86 would transmit the message on a data link 9 in the direction of the arrows 91 and 92 but not in a counter direction to the arrow 87. This insures that all messages will reach all nodes even if several of the data links are disabled unless a node is completely isolated from the network. After the reception of a message at a node, all subsequent receptions of the same message, caused by the flood search mode, will be discarded. Thus, a node will only propagate a message once since discarding of the message duplicates prohibits more than one retransmission of the same message. When a message is first received at any node, it is logged within the message and link tables 60 according to the contents of the message and the link upon which it arrived. This is used to establish the shortest time delay path from any node back to the node originating the message criteria for discarding duplicate messages. This path, of course, is dynamically and automatically updated from message to message as a function of traffic loading and node and link faults. The shortest distance is not always the shortest time delay path. The terminating node 84 will not propagate the message since it is addressed to it, but it can receive the message more than once in which case the duplicate messages are discarded.

Figure 8:
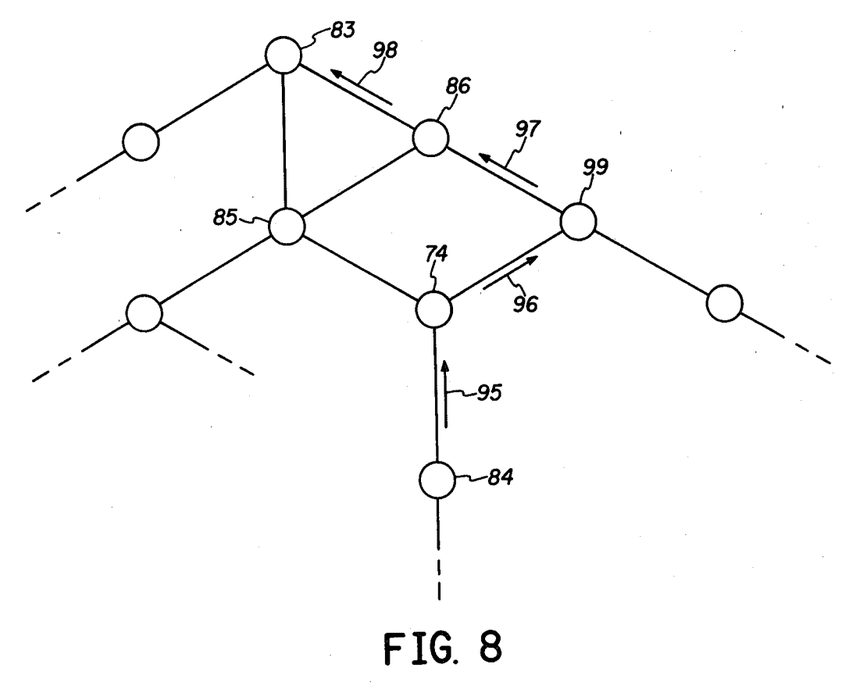
FIG. 8 is a diagram showing the shortest time delay path protocol in a portion of a digital data communications network.

FIG. 8 is a flow diagram of part of the digital data communication network showing the shortest time delay path mode in accordance with the invention. The shortest time delay path is used when a node is responding to a received message. As was discussed in conjunction with FIG. 7, a node originating the message uses the flood search mode and the link on which the message was received is logged in the message and link tables 60 within the interface controller's 13 portion of a message center at a node. Consequently, and as an example of illustrating, the shortest time delay path between nodes 84 and 83 is via nodes 74, 99, 86 and 83 as indicated by flow arrows 95, 96, 97 and 98. Although the actual distance may be shorter by way of nodes 74 and 85, the message and link tables 60 in the example of FIG. 8 would indicate differently. Thus, when node 74 receives a response to a message originated by node 83, the message and link table would indicate that the original message was received via the link that is connected to node 99 so that node 74 would transmit the message as indicated by arrow 96 to node 99 and node 99 would then select the shortest time delay path to node 83 which would be the path that is indicated by flow arrow 97. Node 74, of course, did not have any indication that it had received a message from node 85 because the message from node 85 arrived after the message from node 99 and was discarded. Node 74 then would only know that either there was a delay on the link that included node 85 or that there was a break in that link, consequently, the path indicated by arrows 96, 97 and 98 was selected. If a link in the shortest time delay path, e.g., link 97, should fail after the path was established, but before the response message from the node has traversed the link, the connected node 99 would be unable to transmit the message over the shortest time delay path and would discard the message. The link failure is, as previously described, independently reported by nodes 86 and 99 connected to the failed link. Node 83, not receiving a response from node 84 within a predetermined time interval, and receiving a link failure status message, will automatically retransmit its original request message. This retransmission, using the flood search mode, would establish a different shortest time delay path between nodes 83 and 84, excluding the failed link 97. In an alternate embodiment for handling link faults that occur in the shortest time delay path, node 99 in FIG. 8, which is unable to transmit the message over the shortest time delay path 97, will transmit the message using the flood search mode thus assuring that the message will reach the destination node.

Figure 9:
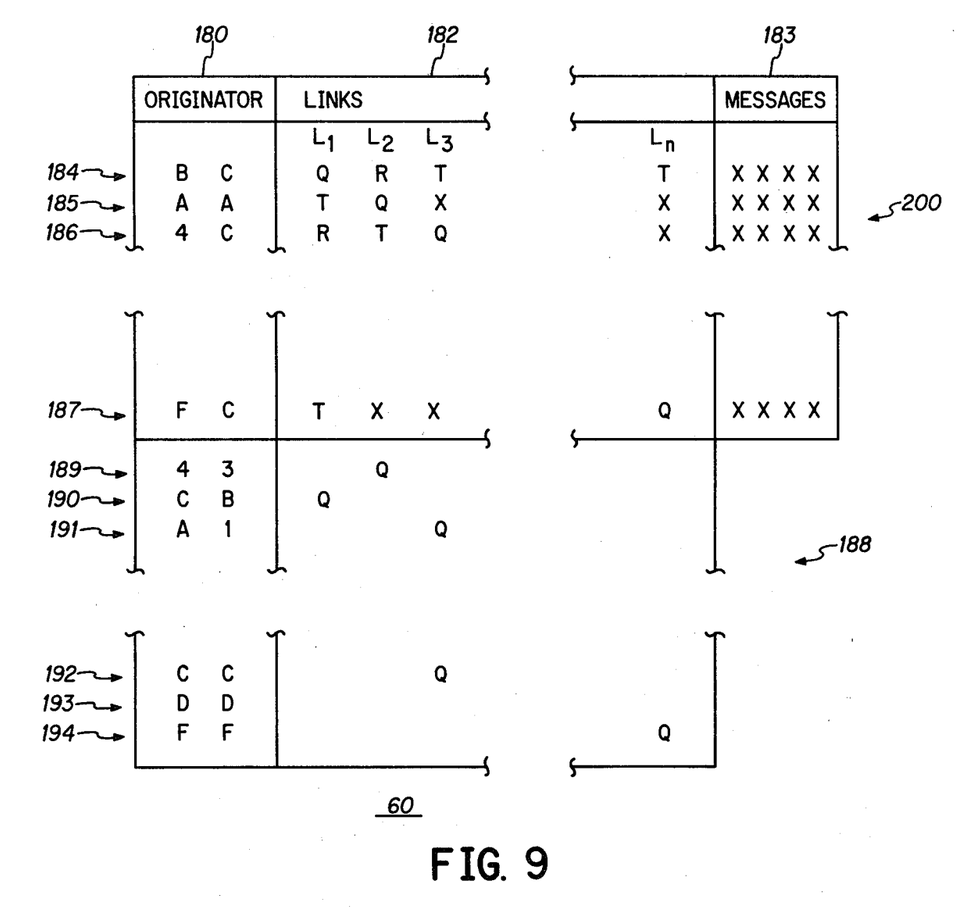
FIG. 9 is a layout of the message and link tables according to the invention.

The layout of the message and link tables 60 is illustrated in FIG. 9 and consists of two sections, the originator address link and message section 200 and the originator address and shortest time delay link section 188. Column 180 provides for the address of the originator of a message that is received through the flood search mode of operation with the corresponding links $L_1$ through $L_N$ shown in columns 182. The message portion of the table consists of those messages shown under columns 183. Row 184 provides the address of the originator as well as the link the message was first received on as indicated by the letter Q under $L_1$. The R flag indicates that a message was received on the link but was not the first message; for example, in row 184 link 1 as designated by $L_1$ received the message first so consequently under the column $L_1$, there is a Q placed in row 184. Link 2 also received the message but it was not the first link in which the message was received upon so there is an R stored under $L_2$ indicating that the message was received on $L_2$ for the address as stored for row 184. In the flood search mode of operation, a node that receives a message will propagate the message on to other nodes except for the nodes that are connected to the link it received the message on. Consequently, links $L_3$ through $L_N$ have a T indicating that the message is to be transmitted to those links. In the case where there is an R, the message will not be transmitted to that link; however, acknowledgment of receipt of the message is transmitted. Row 185 indicates that the message was first received on the link $L_2$ and that the message for link $L_1$ is to be transmitted across that link. An X as shown under row $L_3$ and $L_N$ indicates that either the message was transmitted and an acknowledgment received back from the appropriate links or that the message was queued for transmission but it was received on the appropriate link prior to its being transmitted and consequently, the transmission, after the initiating of an acknowledgment message is cancelled. Row 186 is a similar arrangement in which the flags R, T, Q, and X have an appropriate meaning to those discussed in conjunction with rows 184 and 185. In row 187 all of the messages have been transmitted and an acknowledgment received with the exception of the message that is to be transmitted on link 1. After the message is transmitted on link 1 for row 187 and an acknowledgment is returned, then the message that is stored in row 187 under column 183 is deleted and the address for row 187 along with its shortest time delay link, which in the case of row 187 would be the link that is under the $L_N$ column, is transferred to the originator and link portion of the table 188. Rows 189 through 194 illustrate the addresses of different originating nodes along with the links upon which the originating message was received at the node and is used for selecting the shortest time delay path for messages designated to the originating node.

Figure 10A:
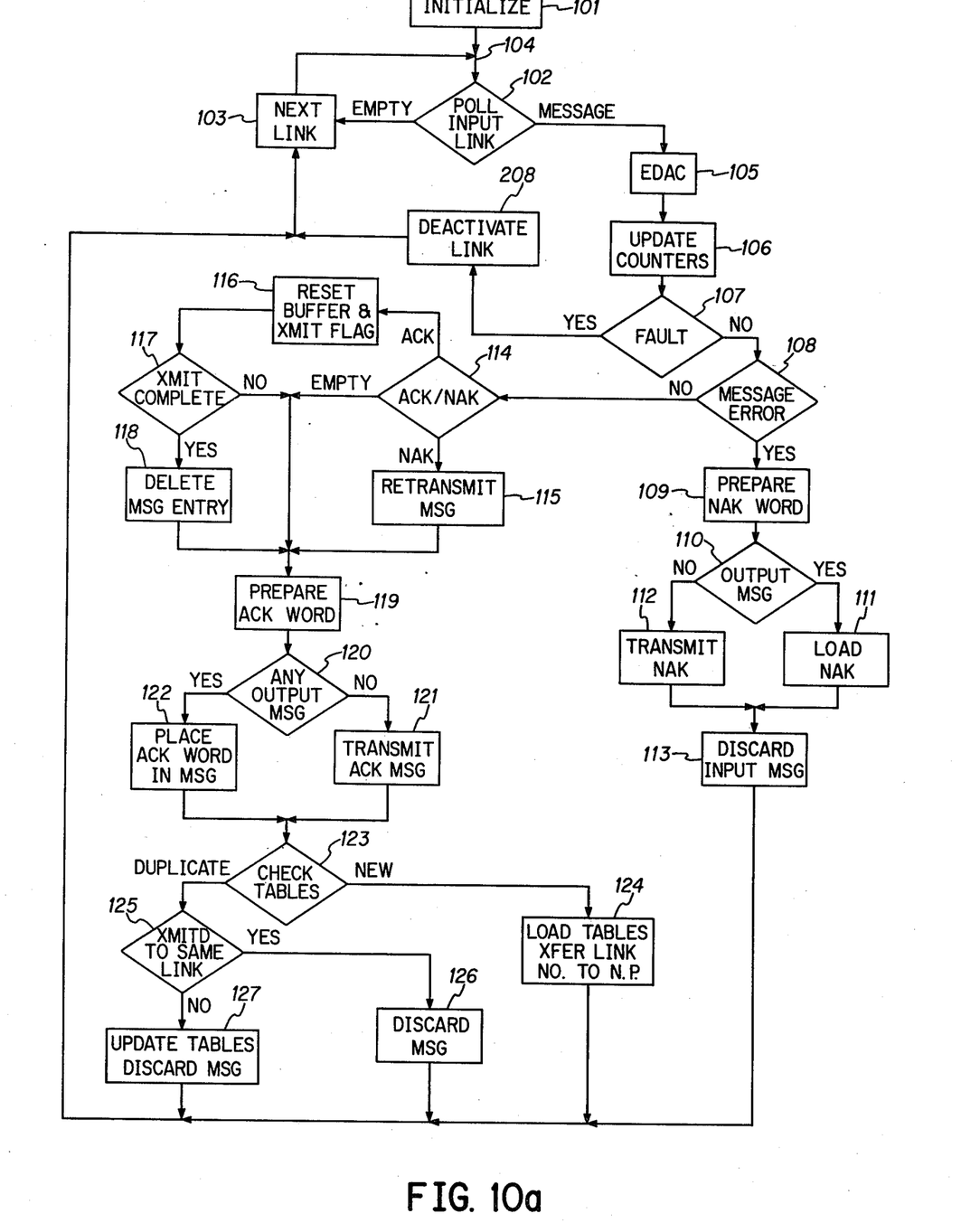
FIGS. 10a, b, and c are flow diagrams illustrating the operation of the interface controller according to FIG. 5.

The function ilustrated in FIG. 5 of the interface controller 13 and FIG. 6 of the nodal processor 19 may be implemented either by discrete logic circuits or in the preferred embodiment by microprocessor technology. A flow diagram illustrating the operation of the interface controller 13 is provided in FIG. 10a to which reference should now be made and also to FIG. 5.

After initialization of the circuit, as indicated by block 101, the acknowledgment logic 58 of FIG. 5 is sequentially monitoring the buffer controllers 56 of channels $i_1$ through $i_N$ for incoming messages. This is indicated on FIG. 10a by the poll input link 102. If there is not a message at an input link, the acknowledgment logic 58 will select the next buffer controller 56 to monitor it for an incoming message as indicated by block 103. The output of block 103 of FIG. 10a returns to point 104 where the acknowledgment logic through the selected buffer controller 56 will be polled to see if there is an incoming message. This process continues sequentially through all the buffer controllers until a incoming message is received within an input buffer 55 of FIG. 5. If there is an input message, then the EDAC logic 57 of FIG. 5 is checked as indicated by block 105 of FIG. 10a. The results of the check of the EDAC code are used to update the ACK/NACK counters contained within the acknowledgment logic 58 at block 106. The acknowledgement logic 58 has included threrein counters for each channel and, consequently, will accumulate over a period of time the number of errors that occur as indicated by the EDAC logic 57 per channel and thus per link. In the event that the number exceeds a selected threshold, there will be a fault indication as indicated by descision block 107 and that link will be deactivated at block 208. When a link is deactivated, the acknowledgment logic as it polls the input link will skip a channel until the expiration of a predetermined time period or there is an indication through one of the I/O terminals that the problem has been corrected. The acknowledgment logic, in the event there is a link fault, will notify the nodal processor 19 via conductor 89 and link status logic 61 that a link fault has occurred. When there is no link fault present and there is a message error as indicated at decision block 108, a NACK word is prepared at block 109 and the message format logic 53 is notified that a NACK word is to be inserted in the next message block 111 if there is a message contained within the output message logic 62 for transmission on that link. If there is not an output message being prepared in the output message logic 62, then as indicated at decision block 110, the message format logic formats a NACK message at block 112 for notifying the node that transmitted the message, that the message contains a transmission error as indicated by the error detection and correction code logic 57. At block 113, the message that contains an error is discarded and the system will select, at block 103, the next channel for polling to insure that there is a message waiting. If there was no message error, as indicated at decision block 108, then the acknowledgment logic 58 at decision block 114 will check the incoming message at the second data field 31 for an ACK or NACK code. If there was contained in the second data field 31 of FIG. 3 a NACK code, then the acknowledgment logic, at decision block 115, will notify the message format logic 53 to retransmit the message stored within the output buffer 54 of the appropriate channel. When there is contained in the second data field 31 the acknowledgment word, then the acknowledgment logic 58, at decision block 116, will notify the message format logic 53 that the message has been received at the neighboring node and to remove that message from the output buffer and the message and link tables 60 and consequently, the link status logic 61 indicating that the channel has acknowledged the last message that was transmitted. As each acknowledgment is returned, then that message through flagging is removed from that channel. When all the acknowledgments have been received for a given message, at decision block 117, the message is deleted from the message and link tables 60. At command block 118, if the ACK/NACK data field contains neither an ACK word or a NACK word, or at the completion of command block 115, or command block 118, the message, if it is just an acknowledgment message, is discarded. However, in most of the cases, the second data field is piggy-backed onto a different message and the acknowledgment logic 58 will prepare, at command block 119, to acknowledge the receipt of the message. At decision block 120, the acknowledgment logic will check to see if the message format logic 53 of the channel upon which the message was received has a message in the output message logic 62 for transmission on that channel. If there is a message contained in the output message logic 62, then the ACK word is inserted at command block 122. If there is not an output message contained within the output message logic 62, then the acknowledgment logic notifies the message format logic to transmit the acknowledgment message at command block 121. At the completion of either of these two commands, the message and link tables 60 at decision block 123 are checked to see if the message is a new message or is a duplicate message of a prior received message. If the message, as indicated in message and link tables 60, is an old message, then at decision block 125, the link that the old message was received on its checked against the link within the message and link tables 60 to see if the message, in the flood search mode, has been transmitted to the node connected to the link upon which the message was received. If the message and link tables 60 indicate that the received message is a message that is buffered but not transmitted at this time, then the message and link tables 60 are updated and the message is discarded at command block 127 being the transmitting node already has received the message. If the duplicate message was a message that was transmitted to the same link as indicated at decision block 125, then the message is discarded at commond block 126 and the acknowledgment logic instructs the interface controller 13 to return to the next input buffer at command block 103. If decision block 123 indicates that it is a new message, then the message is placed in the message and link tables 60 and forwarded on along with the number of the link upon which the message was received on to the nodal processor 19 of FIG. 6 during command block 124 at the completion of which the interface controller 13 returns to command block 103.

Figure 10B:
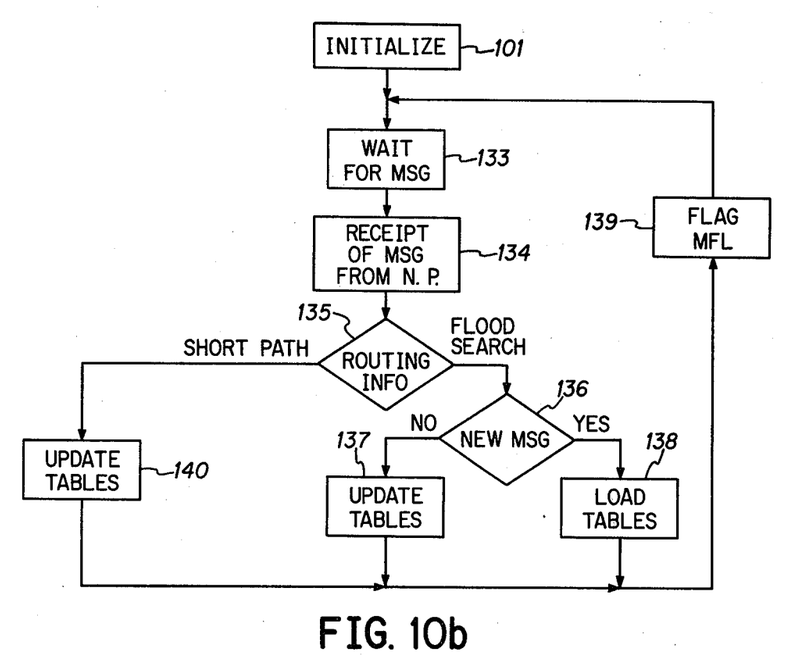

The transmission of information and its associated function within the interface controller 13 essentially involves the output message logic 62 and the message format logic 53. The flow diagram of the operation of the output message logic 62 is illustrated in FIG. 10B. After initialization at block 101, the output message logic 62 waits for the next message to be transferred to it from the nodal processor 19 at command block 133. At receipt of the message from the nodal processor at command block 134, the output message logic 62 decides which mode of transmission is to be implemented at decision block 135. If the message is to be implemented by the flood search mode, the output message logic checks to see if it is a message originating at the node associated with the output message logic 62 at decision block 136. If the message is a new message that originates at the node transmitting the message, then the message is entered into the message and link tables 60 at decision block 138 at which case the transmit flags within the message and link tables 60 are set for all links that the message is going to be transmitted on and the message format logic for all channels $i_l$ through $i_N$ are informed that there will be a message to be transmitted at command block 139 which flags the message format logic 53. When the decision block 136 indicates the the message is an old message, then at command block 137 the message and link tables 60 are checked by the nodal processor 19 and the output message logic will flag the message and only the format logics 53 connected to the links which have not received the message will be activated at decision block 139. The shortest time delay path is taken when at decision block 135 the routing information indicates this requirement. The message and link tables 60 are updated at command block 140 by the output message logic 62 through the operation of the nodal processor 19. At command block 139, the message format logic 53 is flagged.

Figure 10C:
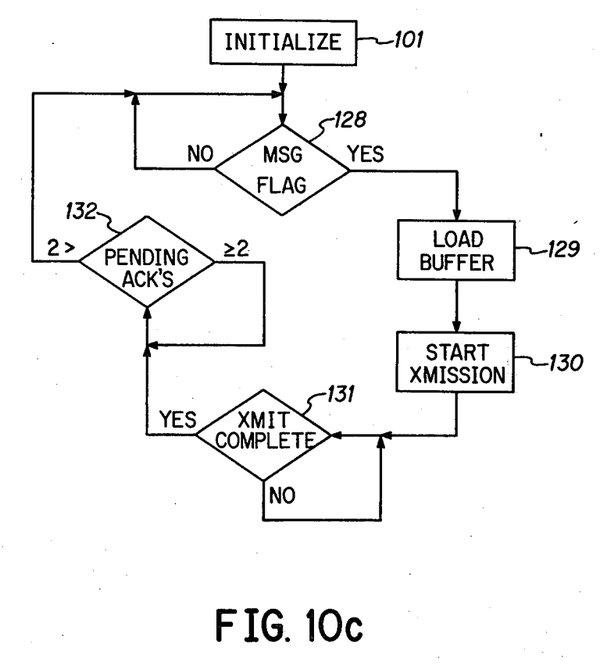

FIG. 10C is a flow diagram of the operation of the message format logic which waits for a message flag from the output message logic at decision block 128 and its associated loops. Upon receipt of the message flag, the output buffers are loaded at command block 129 and transmission is initiated at command block 130. Upon the completion of the transmission at decision block 131, the message format logic checks the acknowledgment logic 58 to see if there are any outstanding acknowledgments. If the number of outstanding acknowledgments is less than two, (decision block 132) then the message format logic returns to the wait condition for a message flag to be received from the output message logic. If the number of outstanding acknowledgments per link is greater or equal to two, the message format logic 53 will wait until the number of outstanding acknowledgments becomes less than two and will not initiate any further transmission on that data link until there are fewer than two outstanding acknowledgments.

Figure 11:
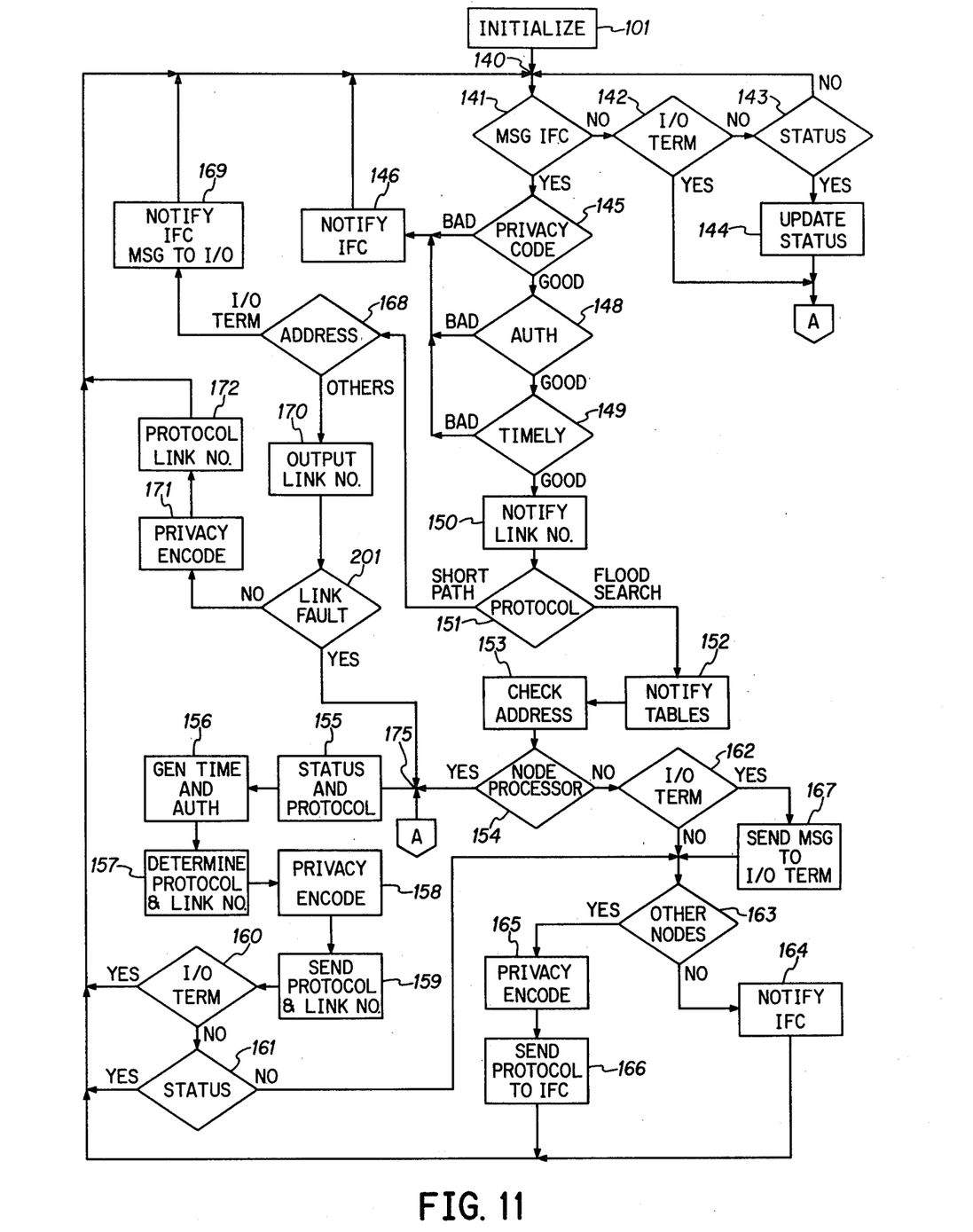
FIG. 11 is the flow diagram of the operation of the nodal processor of to FIG. 6.

The operation of the nodal processor 19 is illustrated by the flow diagram contained in FIG. 11 which should be used in conjunction with FIG. 6. After initialization at block 101, the nodal processor 19 through the protocol logic 72 is continually monitoring for a received message from the interface controller 13 provided on conductor 25 at the privacy code logic 71 if that option is implemented, or an input from an I/O terminal via one of the conductor pairs 23 and the message arrangement logic 75, or input status from the interface controller 13 via conductor 27 through the status control logic 73. Taking the case where there is a received message conveyed to the nodal processor 19, then the privacy code (block 46), the authentication (block 148) and the timeliness (block 149) checks are performed as was discussed earlier and in the event any one of those three checks failed, then the interface controller 13 is notified (block 146) to record this event in the status control logic and delete the message entry in the message and link tables 60 contained within the nodal processor 19 and after which the nodal processor 19 returns to point 140 to wait for incoming messages as indicated by decision blocks 141 through 143. If all three checks on a received message from the interface controller 13 indicate that the message passes these checks or if these options are not utilized, then the interface controller 13 is notified at command block 150 and the status control logic 73 receives the link identification or the channel number on which the message was received on via conductor 27. The protocol logic at decision block 151 checks to see by which mode of operation the message is to be transmitted or retransmitted, either the shortest time delay path mode or the flood search mode. At decision block 152 for the flood search mode, the nodal processor 19 will determine the originator of the message from the protocol word located within the third data field 32 of the message format shown in FIG. 3 and update the message and link tables 60 as to the link in which the originator message was received upon. The address of the message which is contained in the seventh data field 36 is checked (block 153) to see if it is addressed to one of the addresses assigned to the nodal processor 19 or the node and its I/O terminals of which the nodal processor 19 is a part of at decision block 154. Returning to decision block 142, if a message is input from an I/O terminal, then the nodal processor 19 will return to point 175 via Home Plate A or if input status is received from the interface controller as indicated by the decision block 143 after the status table within the message and link tables 60 are updated at command block 144, the nodal processor 19 again returns to point 175. Therefore, point 175 will accept a positive decision from an indication that the address is assigned to the node receiving the message or an input from an I/O terminal or status input at block 175. Given the above listed events and possibility, the nodal processor 19 will then assemble the status message and protocol information, generate time and authentication checks if these options are used at command blocks 156, determine the output link or channel number and protocol to be used at command block 157, privacy encode the message for forwarding to the interface controller 13 at command block 158, and send link number to the interface controller 13 that is obtained from the message and link tables 60 at command block 159. If the return message is being assembled in response to an input from the I/O terminal, as indicated by decision block 160 or an input status message from the interface controller 13, as indicated by the command block 161, the nodal processor 19 returns to the point 140. If the above steps were performed in response to the flood search mode or protocol of a received message, or if the nodal processor 19 at the verification of the address determines that it is not an assigned address and the message is to an I/O terminal at command block 162, the message is transferred to the I/O terminal at command block 167, the completion of which all three possibilities will come together at decision block 163 which checks to see if the message is to be propagated to other nodes. When the message is to be propagated to other nodes, the message is privacy encoded and forwarded to the interface controller 13 at command block 165 along with the protocol information as determined by the protocol logic at command block 166 at which case the nodal processor 19 returns to point 140.

The shortest time delay path, if indicated by the protocol decision block 151, includes the steps of checking the address to see if its addressed to an I/O terminal in which case the interface controller 13 is notified to delete the message and the message is forwarded to the I/O terminal at command block 169 and the nodal processor 19 returns to point 140. If the shortest time delay path message as indicated by decision block 168 is addressed to others, the nodal processor 19 will determine the output link number from the message and link tables 60 at command block 170, check to see if there is a link fault at decision block 201, if this embodiment is implemented, and return to command block 175 for the flood search mode if there is a link fault, or if no link fault, privacy encode the message and forward to the interface controller at command block 171 and send the protocol and link number to the interface controller at command block 172, the completion of which will result in the nodal processor 19 returning to point 140.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

We claim:

1. A distributed digital data communication network, comprising:
   a plurality of nodes geographically separated;
   a plurality of full duplex data lines connected to the plurality of nodes such that each node is connected to its neighboring nodes by a data link between each of the neighboring nodes;
   flood search means for propagating a first message through the digital data communication network from an originating node that is a member of the plurality nodes to an address homed at a destination node that is also a member of the plurality of nodes; and
   shortest time delay path means for propagating a response message over the shortest time delay path, in response to the first message, from the destination node to the originating node via a data link that each node of the plurality of nodes first received the first message on.

2. The distributed digital data communication network according to claim 1 further comprising:
   deletion means at each member of the plurality of nodes for discarding duplicates of the first message when received at the number of the plurality of nodes.

3. The distributed digital data communication network according to claim 2 wherein the deletion means comprises:
   a storage means for storing of each message as it is received; and
   a comparator means for comparing each message with those that are stored within the storage means.

4. The distributed digital data communication network according to claim 1, further comprising:
   error checking means for checking all messages for transmission errors.

5. The distributed digital data communication network according to claim 4, wherein the error checking means, comprises:
   error code generator means for including an error code in all messages transmitted between the nodes;
   error code check means for checking the error code included in all messages at a receiving node; and
   indicator means for indicating to the last node to propagate a message the results obtained by the error code check means.

6. The distributed digital data communication network according to claim 5, wherein the indicator means, comprises:
   acknowledge means for indicating to the last node to propagate the message the results obtained by the error checking means.

7. A distributed digital data communication network according to claim 1, further comprising:
- detector means for detecting and isolating any faults in any data links; and
- means for maintaining data message flow when there is a data link fault.

8. A method for conducting communications between geographically separated points in a distributed digital data communication network having a plurality of nodes geographically separated and a plurality of full duplex data links connected to the plurality of nodes such that each node is connected to its neighboring node by a data link between each of the neighboring nodes, comprising:
- propagating a first message through the digital data communication network from an originating node that is a member of the plurality nodes to an address homed at a destination node that is also a member of the plurality of nodes; and
- propagating a response message over the shortest time delay path, in response to the first message, from the destination node to the originating node via a data link that each node of the plurality of nodes first received the first message on.

9. The method according to claim 8 further comprising the step of:
- discarding duplicates of the first message at each node;

10. The method according to claim 8 wherein the step of discarding duplicates of the first message, comprises:
- storing each message that is received by a receiving node;
- comparing any received message with the stored messages; and
- inhibiting all action by the receiving nodes to a duplicate message.

11. The method according to claim 8 further comprising the step of:
- checking all messages for each transmission error.

12. The method according to claim 11, wherein the step in checking all messages for transmission errors, comprises:
- including in all messages transmitted between nodes an error code;
- checking the error code included in all messages at a receiving node; and
- indicating to the last node to propagate a message, the results of the step of error checking.

* * * * *